(12) United States Patent
Haas et al.

(10) Patent No.: US 12,411,821 B2
(45) Date of Patent: Sep. 9, 2025

(54) ASYNCHRONOUS DISTRIBUTED DATA CLEANSING

(71) Applicant: SAP SE, Walldorf (DE)

(72) Inventors: Nichole Haas, Belleville, WA (US); Anuja Khemka, Bellevue, WA (US); Anikate Singh, Bellevue, WA (US); Samartha Tumkur Vani, Bellevue, WA (US); Lu Zhang, Bellevue, WA (US)

(73) Assignee: SAP SE, Walldorf (DE)

( * ) Notice: Subject to any disclaimer, the term of this patent is extended or adjusted under 35 U.S.C. 154(b) by 682 days.

(21) Appl. No.: 15/799,871

(22) Filed: Oct. 31, 2017

(65) Prior Publication Data

US 2019/0129981 A1  May 2, 2019

(51) Int. Cl.

| | |
|---|---|
| G06F 16/215 | (2019.01) |
| G06F 16/23 | (2019.01) |
| G06F 16/2458 | (2019.01) |
| G06F 16/25 | (2019.01) |
| G06F 16/27 | (2019.01) |
| G06N 20/00 | (2019.01) |

(52) U.S. Cl.
CPC ........ *G06F 16/215* (2019.01); *G06F 16/2365* (2019.01); *G06F 16/2471* (2019.01); *G06F 16/258* (2019.01); *G06F 16/27* (2019.01); *G06N 20/00* (2019.01)

(58) Field of Classification Search
CPC .... G06F 16/215; G06F 16/2471; G06F 16/27; G06F 16/258; G06F 16/2365; G06N 20/00
See application file for complete search history.

(56) References Cited

U.S. PATENT DOCUMENTS

| | | | |
|---|---|---|---|
| 2003/0225770 A1* | 12/2003 | Lang | G06F 16/215 |
| 2004/0220955 A1* | 11/2004 | McKee | G06Q 30/02 |
| 2006/0117238 A1* | 6/2006 | DeVries | G06F 19/36 |
| | | | 714/746 |
| 2009/0198678 A1 | 8/2009 | Conrad et al. | |
| 2014/0019426 A1* | 1/2014 | Palmer | G06F 16/256 |
| | | | 707/694 |
| 2015/0379430 A1* | 12/2015 | Dirac | G06N 20/00 |
| | | | 706/12 |
| 2016/0048770 A1* | 2/2016 | Thomas | G06Q 30/01 |
| | | | 706/12 |
| 2016/0180245 A1* | 6/2016 | Tereshkov | G06F 16/2237 |
| | | | 706/12 |
| 2017/0308557 A1* | 10/2017 | Cassidy | G06F 12/0253 |
| 2018/0075103 A1* | 3/2018 | Kogan | G06F 16/2455 |
| 2020/0067789 A1 | 2/2020 | Khuti et al. | |
| 2022/0076231 A1* | 3/2022 | Farrell | G06Q 20/3224 |

\* cited by examiner

*Primary Examiner* — Apu M Mofiz
*Assistant Examiner* — Husam Turki Samara
(74) *Attorney, Agent, or Firm* — Fountainhead Law Group, PC

(57) ABSTRACT

In one embodiment, the present disclosure pertains to data cleansing. In one embodiment, data cleansing is performed across a distributed master data store asynchronously in a scalable architecture, thereby allowing vast amounts of input records to be processed more efficiently.

21 Claims, 6 Drawing Sheets

ASYNCHRONOUS DISTRIBUTED DATA CLEANSING

CROSS REFERENCE TO RELATED APPLICATIONS

The present disclosure contains subject matter related to the subject matter in the following concurrently filed patent application: U.S. patent application Ser. No. 15/799,890, entitled "Dynamically Generating Normalized Master Data."

BACKGROUND

The present disclosure relates to computing and data processing, and in particular, to systems and methods for data cleansing.

The widespread adoption of using computers for data processing has led to number of challenges. One challenge stems from the wide variety of representations real world entities may take on when represented in electronic form. For example, a particular hotel such as "Westin Bellevue" may be represented in a computer in a number of different ways. For example, some systems may represent an entity as an abbreviation (e.g., Belv Wstn WA") to achieve a compact data representation, and other systems may simply apply truncations (e.g., "Bell West WA"). Yet other systems may supplement entity descriptions, use partial descriptions (e.g., partial strings), or simply use different representations for the same entity. These challenges are compounded where new entities (e.g., new hotels) and new representations of new or old entities are being created over time.

Thus, reconciling and processing different data representations are a challenge for computer programmers and developers especially when applied across potentially massive data sets that may change over time. The present disclosure provides techniques for generating normalized master data.

SUMMARY

Embodiments of the present disclosure pertain to data cleansing. In one embodiment, input records comprising string representations of entities are received from multiple sources. The input records may be used as queries to a similarity search data store of master data records. One or more most likely matching master records are returned with corresponding similarity scores. The input record, master record, and a training set are processed using a machine learning algorithm. In one embodiment, one or more similarity scores are incorporated into the machine learning algorithm. The machine learning algorithm produces a final score. Data from input records may be merged into the master records if the final score is greater than a threshold.

In another embodiment, data cleansing is performed across a distributed master data store asynchronously in a scalable architecture, thereby allowing vast amounts of input records to be processed more efficiently.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Dynamically Generating Normalized Master Data

Figure 1:
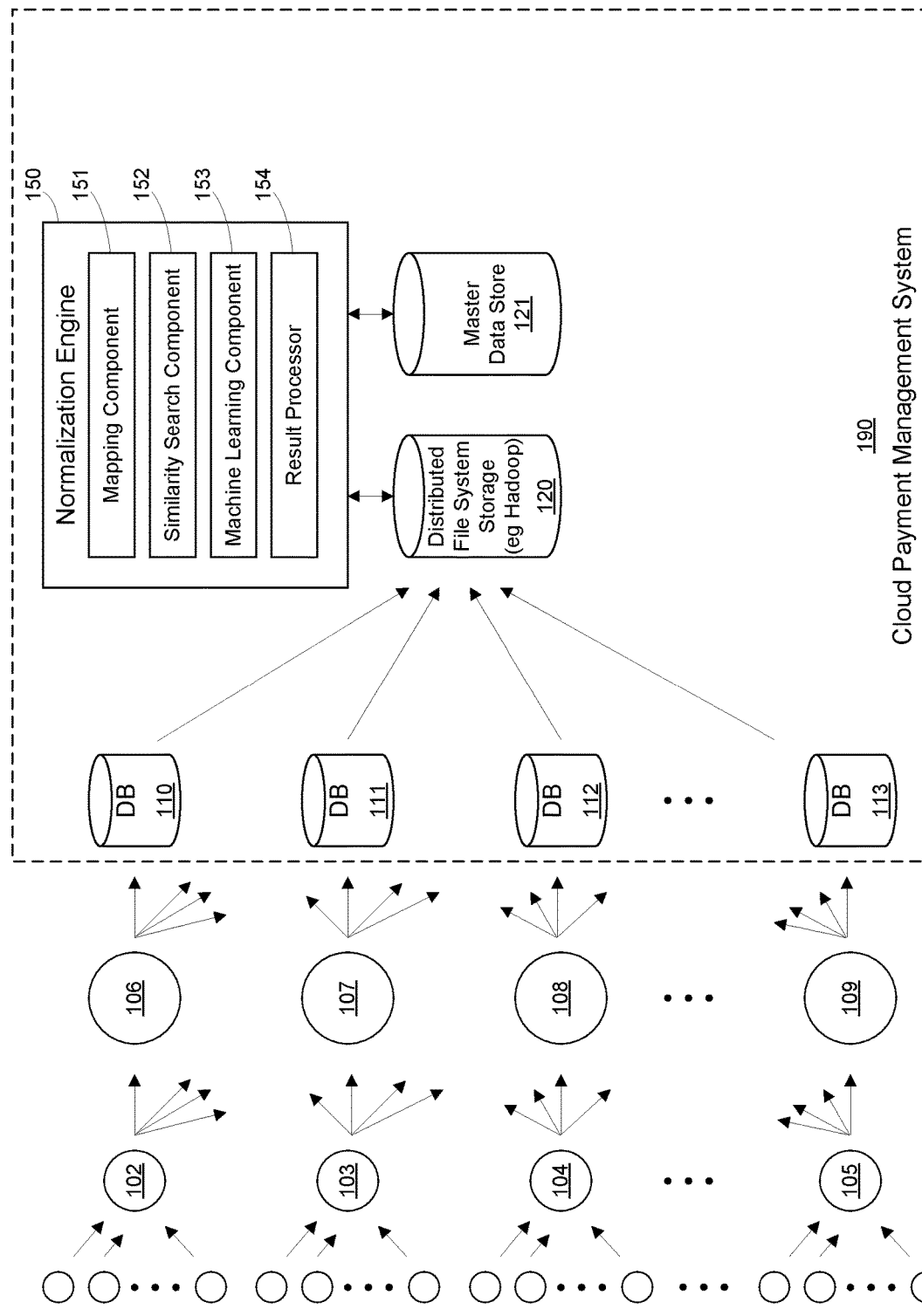
FIG. 1 illustrates an architecture for generating normalized master data according to one embodiment.

FIG. 1 illustrates an architecture for generating normalized master data to one embodiment. Features and advantages of the present disclosure include techniques and software components for gathering string representations of entities, which may be associated with particular locations, for example, and generating master string representations for the entities. In the following description, string representations generated by credit card transactions for hotels and retailers are provided as one of many possible examples for illustrative purposes only. One of ordinary skill in the art will realize that the techniques described herein may be applied to a wide range of other data cleansing applications as well as generating and/or linking master data to other entities, such as items, products, or services, for example.

In FIG. 1, users 101 may perform transactions at one or more points of sale (POS) 102-105 for products or services of some provider entity. As mentioned above, example POS transactions may be credit card purchases for a hotel entity, which may have a particular location (e.g., an address). POS 102-105 may be the hotels themselves or online booking services (e.g., Expedia®), for example. When a transaction occurs, a data record may be generated to represent the transaction electronically. The data record may then be sent the particular payment system 106-109 used to process the transaction. Payment systems 106-109 may include different credit card companies, for example, such as American Express®, VISA®, Mastercard®, or the like. As illustrated in FIG. 1, many users 101 may perform many POS transactions 102-105 to produce large volumes of transactional data. However, different POS transactions may represent a transaction for a product or service of a particular entity in a number of different ways. For example, if strings are used to represent the transactions, then a transaction with a particular hotel, such as the Bellevue Westin, may be represented by different systems as "Bel West WA," "Belv W. WA," "Belv Wstn WA," "Bell West WA", for example, or any of a wide number of other alternative representations. Data records for each transaction are stored using different string representations in different payment systems 106-109.

In one embodiment, transactional data records comprising string representations of an entity are stored in databases (DB) 110-113. In one embodiment, databases 110-113 are expense databases in a cloud computer system 190. For example, expense database 110 may be one of multiple databases included in a payment management system 190, where different companies are provided a different database instance to consolidate, pay, and report on expenses incurred by the company's employees. Accordingly, database 110 may store transactional data from a plurality of sources, such as different payment systems 106-109. The transactional data may include a plurality of input records, where each input record includes a string representation of an entity, which may have a particular location, such as a hotel, for example. Problematically, the records from different sources may represent the particular entities and even the corresponding locations using a plurality of different string representations.

Features and advantages of the present disclosure include receiving transactional data from databases 110-113 in a distributed file storage system 120, which may be included on cloud computer system 190, for example. File system 120 may be a Hadoop storage system, such as Apache Hadoop, for example. As mentioned above, the stored records may be string representations of the entities, the locations of the entities, and related data, for example, where the same entity may be represented using multiple different strings. In one embodiment, a master data store 121 may store master records including master string representations of particular entities. For example, a master record string representation for a hotel may be as follows:

[Westin Bellevue Downtown; 100 Bellevue Way; Bellevue; WA; 98004; <other string components>; Merchant ID: 204505; Amadeus: XYZYZ]

Embodiments of the present disclosure may add new master records, add additional data to existing master records, and update incorrect data in an existing master record over time.

Computer code (executable software) on cloud computer system 190 may include a normalization engine 150 for accessing records in the distributed file system 120 and master data store 121 and performing operations to dynamically generate master data, for example. In one embodiment, such code may include a mapping component 151, a similarity search component 152, a machine learning component 153, and a result processor 154, which may be part of normalization engine 150, for example.

In one embodiment, input records from multiple payment systems, including a wide variety of credit card systems, for example, may be received in a distributed file system 120, for example. String representations of the entities may include a wide range of string components including a name string, an address string, a phone number string, and a zip code string, for example. In various embodiments, input records may further include a payment system identification (ID), a supplier ID (sometimes referred to as a "merchant ID"), and codes corresponding to a plurality of entities such as chain codes (e.g., a code for a chain of hotels such as Hyatt®) or network codes (e.g., networks of hotels) such as a Northstar Code, Amadeus Code, Galileo Code, Sabre Code, or Worldstar Code, for example. APPENDIX A illustrates an example of an input record structure as well as examples of multiple records that may be received. One example record and its corresponding fields is as follows: AX (American Express®), 2096322110 (Hotel Merchant ID), 7011 (transaction description code—7011=hotel; 3000=United Airlines®), BVP TENANT, LLC HILTON BVP FD 04202 (Legal Name), HILTON BUENA VISTA PALACE (Doing Business As, DBA), 1900 E. BUENA VISTA DRIVE (Street Address 1), LAKE BUENA VISTA FL (Street Address 2), ORLANDO (City), FL (State), US (Country), 32830 (Postal Code), 472197652 (tax ID). Comparing example records in APPENDIX A, it can be seen that different records that are received over time may include different data as well as different data fields. Advantageously, embodiments of the present disclosure match received input records with master records and, in some embodiments, further update or supplement, or both, the data in the master records over time using data from the received records (e.g., when confidence of a match is very high as described below).

In one example embodiment, input records may advantageously be ordered in distributed file system 120. For example, it may be desirable in some implementations to process records with the highest occurrence. If there are, for example, 400,000 different hotels referenced by millions of records, it may be advantageous to order the records by number of occurrences, where data records have the highest number of the same hotel name string representations (e.g., "Bel Wst, WA") are processed before records with lower numbers of occurrences, for example. For example, in one embodiment the system may perform a count on concatenated fields of inputs, namely entity name, address, city, subdivision, etc. from credit card feeds of users, and sort records by their frequencies. The system may prioritize the ones with larger impacts on end users, and then resolve and cover major ones in master data.

Figure 2:
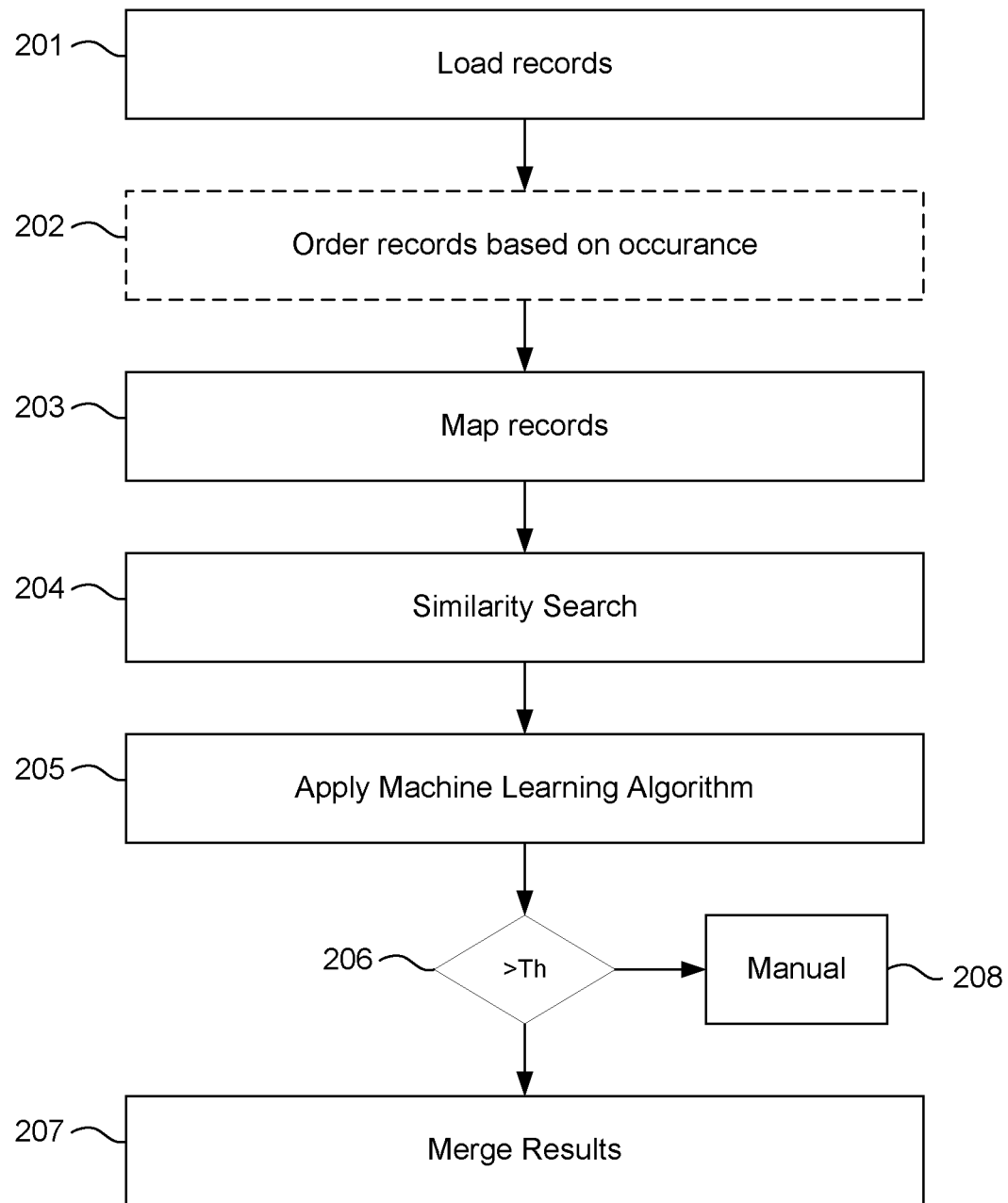
FIG. 2 illustrates a process for generating normalized master data according to an embodiment.

FIG. 2 illustrates a process for dynamically generating normalized master data according to an embodiment. At 201, transactional data records comprising string representations of entities are received from a plurality of databases and loaded into a distributed file system, for example. As mentioned above, the transactional data may be received in each database from a plurality of sources (e.g., payment systems). Each data record may include a string representation of an entity having a particular location (e.g., addresses of hotels, retailers, or POS locations), where records from different sources represent particular entities having corresponding locations using a plurality of different string representations. At 202, the records may be ordered based on occurrence. As mentioned above, this option may be advantageous in a system processing large volumes of data so that transactions with entities that occur at a higher frequency (e.g., more popular hotels) may be processed first to provide more relevant information faster to customers and reporting tools, for example. At 203, string components of one or more of the string representations in each input record are mapped into one or more corresponding master string components. As described in more detail below, an initial mapping of string components into a standard form may improve the accuracy and speed of downstream processes, for example. At 204, the strings in the input records may be used to perform a similarity search. A similarity search may retrieve N, an integer, master record string representations from master data store 121, for example. The N master records may have the N most similar (e.g., the top 3 most similar) master string representations in the master data store to a string representation provided in a similarity search query, for example. In one embodiment described in more detail below, the similarity search may produce N results with corresponding similarity scores, for example. At 205, particular input record string representations, the N master string representations from the similarity search, and a training set are processed using a machine learning algorithm to produce a final score, for example. The final score may indicate a likelihood of a match of a particular input record string representation to a particular master record string representation. In one embodiment, the final score is compared to one or more thresholds at 206. If the final score is above a predefined threshold (>Th), a particular record may be merged into the master record at 207, for example. Otherwise, the input record may be processed manually at 208, for example. Merging may include adding/appending data from the incoming record to the master record, such as a merchant ID or another code that is in the incoming record but which is not yet in the master record, for example. In one embodiment, merging may include linking the incoming record to the master record for further processing.

One example mapping may include both validation and standardization. For example, an input record may include multiple string components as described above and illustrated in APPENDIX A. String components may include an entity name, address, city, state, zip code, and phone number, for example. Different string components may have corresponding patterns that may be used to validate and standardize the incoming string representations. For example, phone numbers may be received in a wide range of formats, such as 123-456-7890, 1234567890, (123) 465-7890, or +1234567890, for example. A pattern may determine if a received string in the phone number position of the record has 10 digits, regardless of intermediate characters. If 10 numerical digits are found, the number is validated and mapped to a standard string format such as "1234567890", for example. Similarly, a U.S. zip code may be tested for 5 or 9 digits according to two zip code patterns—12345 and 12345-6789, for example. If 5 or 9 digits are found, the zip code is validated and mapped to a standard form. In some embodiments, even invalid inputs may be tagged as invalid and used in further processing steps to help improve scoring, for example. In various embodiments, other string components may be mapped to other master string components. For example, ST, Str, and S, may be mapped to "Street", MN, Mn, mn may be mapped to "MAIN", and 1$^{st}$ may be mapped to "FIRST", for example. For some input records, there may be no matches of the input string representations with string component specific patterns used for a string component mapping (e.g., "ST" or "Str" or "S"→STREET), for example. In one example embodiment, particular components of the string representations from the received records are compared to predetermine string representations using regular expression matching (e.g., input string component for street="Str" is compared to known variants: "St.", "St", "ST", and "Str"). When a regular expression match occurs, the initial input string component for street may be overwritten or associated with master string representation, "STREET", for example. As mentioned above, validating and standardizing may be advantageous to improve the speed and accuracy of similarity searching and machine learning steps.

In one example embodiment, after the records are ordered by occurrence and mapped, the records may form a query of a similarity search across master data records in master data store 121. Thus, the input string representations, including any mapped, validated, and standardized input strings, may be used as similarity search inputs against the master string representations. For example, master data string representations in data store 121 may be indexed and stored in an elastic search data store 121, which may use token based mapping on strings and tokens are indexed, for example. An example elastic search data store 121 includes Elasticsearch, which is a search server based on Lucene. Elasticsearch provides a distributed, multitenant-capable full-text search engine with an HTTP web interface and schema-free JSON documents, for example. Embodiments of an elastic search data store 121 may include a similarity search component. A similarity search using the input record strings may produce a score based on a scoring or ranking model, for example, which defines how matching documents are scored. Similarity may be per field (e.g., string component by string component) in some implementations, where different similarities can be defined per field based on the mapping. Accordingly, the similarity search may be weighted, where input string components that are more indicative of a match may be given greater weights, for example.

In one embodiment, input strings may be analyzed and searched on a token by token basis. For example, if an input record string component for name is "Belv Wstn DT", then the string may be divided into tokens in a number of different ways—e.g., words, one or more characters, etc. In one embodiment, similarity may be based on a term frequency inverse document frequency (TF/IDF) model by comparing tokens to tokens generated from master record strings, for example. The result of a similarity search may be an ordered set, for example, of matching master data records and scores indicating the degree of similarity between the strings in the input record and the strings in the master record, for example. As mentioned above, the system may receive the top N most similar master records from the search and use such records in a machine learning algorithm, for example. The following is an example of an input record including a string representation of an entity together with the results of a similarity search:

Input: The similarity search may receive queries using the fields below. In some embodiments, except for "name" others could be empty or optional.
Name
Address
Locality (city)
Region (state)
Country (country code)
Postal code Example—Input Query {"name": "Bellevue Westin", "address": "", "locality": "Bellevue", "region": "WA", "postal_code": "", "country": "US"}

Similarity Search Result—Top N Master Data Records (N=3) and associated scores:

- {"name": "THE WESTIN BELLEVUE", "address": "600 BELLEVUE WAY NE", "locality": "BELLEVUE", "region": "WA", "postal_code": "98004", "country": "US"} - similarity_score1
- {"name": "OAKWOOD BELLEVUE", "address": "938 110TH AVE NE", "locality": "BELLEVUE", "region": "WA", "postal_code": "98004", "country": "US" } - similarity_score2
- {"name": "OAKWOOD BELLEVUE", "address": "300 112TH AVE SE", "locality": "BELLEVUE", "region": "WA", "postal_code": "98004", "country": "US" } - similarity_score3

From the above results, it can be seen that master records in the master data store include string representation components for many of the same fields as are found in the input records: name, address, city/locality, state/region, zip/postal code, and country, for example. Advantageously, embodiments of the present disclosure may, over time, supplement additional data fields (e.g., codes and IDs described above) to the master records that are found in the input records but not found in the master records when there is a high confidence of a match as described in more detail below.

Features and advantages of the present disclosure include processing each input record, one or more of the N master records corresponding to each input record, and a training set using a machine learning algorithm to produce a final score. The final score indicates a likelihood of a match of a string representation in a particular input record to a master string representation in a particular master record. While it is to be understood that a variety of machine learning algorithms may be used according to various applications and implementations, the use of such algorithms is illustrated below through a number of examples and embodiments.

In one embodiment, a training set may include sample input records, which may be provided to the similarity search engine, as well as at least one corresponding similarity search master record result. In one embodiment, similarity search scores are integrated into the training set by combining the top N scores and including the result in the training set (e.g., using a sigmoid function as described below). Accordingly, the scores from the similarity search are advantageously integrated into the training set to synergize the similarity search with the machine learning algorithm applied to the input record and similarity search results. In one embodiment, the training set may include similarity search scores for known matches and known no matches. For example, one training set that may be used may include 14,000 reviewed/labeled input record queries and results (e.g., for hotels), which contain both match and no match cases. The labels, match or no match, are what the system uses to learn from in order to predict later input records with a high accuracy, for example. Matched cases may be characterized as a combination of "good sufficient information" and a "perfect match," for example. No match cases may be characterized as, "given limited information, we aren't not sure what you're looking for" or "given some information, we cannot find a match in our master list," for example. As described in more detail below, embodiments of the present disclosure may use the training set to generate weights that are used in an algorithm to generate a final score. Advantageously, embodiments of the present disclosure incorporate sample input record queries, similarity search results, and scores, which in some cases may include both match and no match cases, into the training set. The training set, in turn, generates weights that may be used in yet another algorithm for generating a final score for each input record as they are processed. Thus, the weights integrate such information into the final score to produce more accurate results, for example. An illustrative training set is as follows:

Fields—[query_name, result_name, query_string, result_string, dice, dice_name, dice_addr, same_street_number, sigmoid, label]

T1=[ROANOKE LODGING LLC; SHERATON ROANOKE HOTEL CONFERENCE CENTER; ROANOKE LODGING LLC 2801 HERSHBERGER RD NW ROANOKE VA ROANOKE Va. 24017-1941; SHERATON ROANOKE HOTEL CONFERENCE CENTER 2801 HERSHBERGER RD NW ROANOKE VA 24017 1941 US 10.694553; 0.660550459; 0; 0.833333333; 1; 0.894934221; 0]

T2=[ATLAS HOSPITALITY, LTD.; HOLIDAY INN EXPRESS IRVING DALLAS FT WORTH AIRPORT NORTH; ATLAS HOSPITALITY, LTD. 4550 W JOHN CARPENTER FWY IRVING TX IRVING Tex. 75063-2301; HOLIDAY INN EXPRESS IRVING DALLAS FT WORTH AIRPORT NORTH 4550 W JOHN CARPENTER FWY IRVING TX 75063 US 5.9047256; 0.633093525; 0.290909091; 0.848484848; 1; 1; 1]

T3=[KIMBERLY HOLDINGS LLC; KIMBERLY HOTEL; KIMBERLY HOLDINGS LLC 145 E 50TH ST NEW YORK NY NEW YORK NY 10022-9502; KIMBERLY HOTEL 145 E 50TH ST NEW YORK NY 10022 US 5.975855; 0.752941176; 0.518518519; 0.736842105; 1; 1; 1]

where dice, dice_name, dice_address, same_street, sigmoid, and label are example sub-algorithms that are used to generate a final score as described in more detail below.

Figure 3:
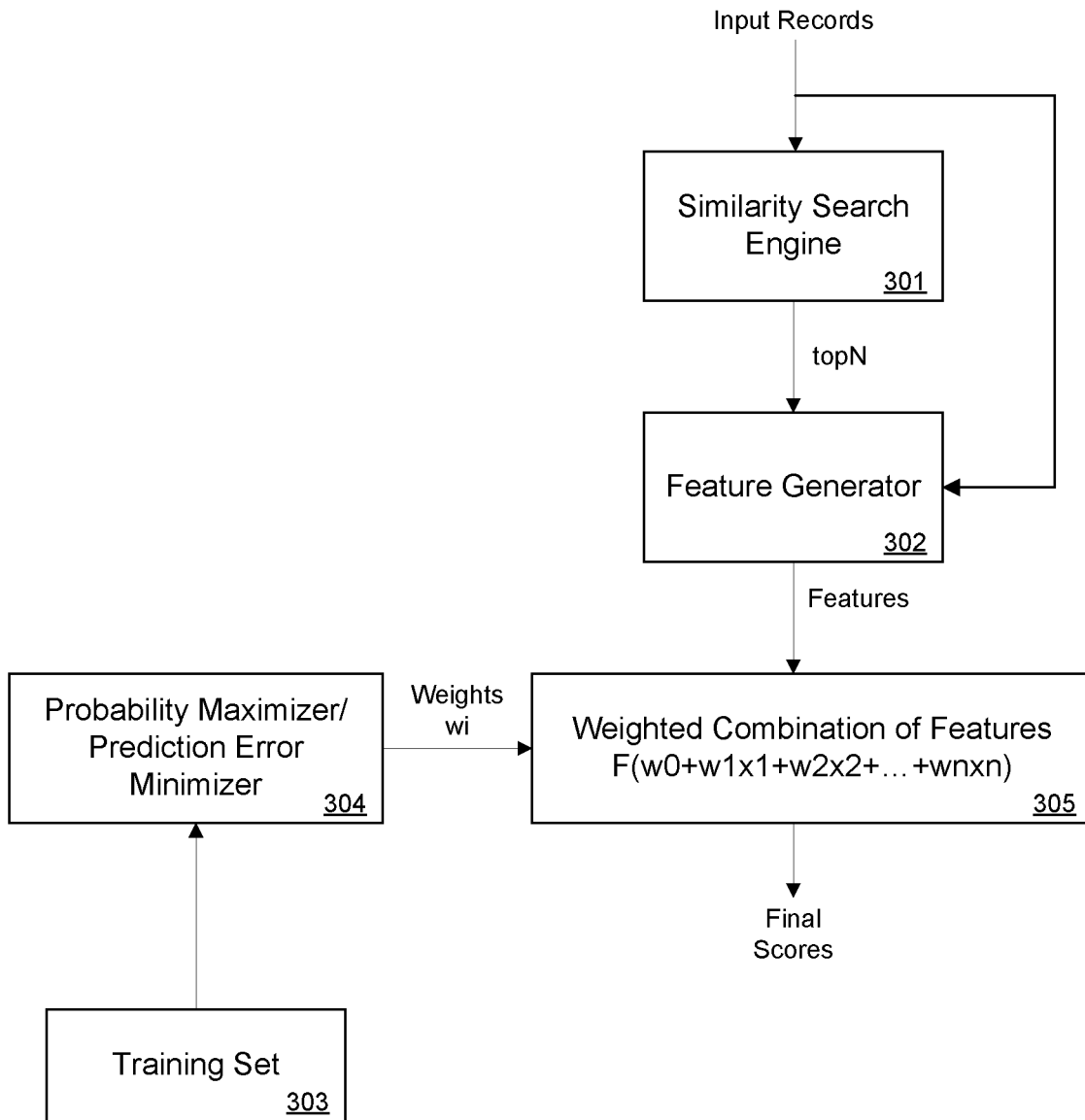
FIG. 3 illustrates method including a coupled similarity search and machine learning algorithm according to another embodiment.

FIG. 3 illustrates method including a coupled similarity search and machine learning algorithm according to another embodiment. As mentioned above, input records may be used as queries in a similarity search engine 301. The output of the similarity search may include the topN most similar master records, for example. The topN master records and the input record used to retrieve them may be input to a feature generator 302. According to various embodiments, a number of features of the input record and master record may be determined for a machine learning algorithm. In one embodiment, the input record strings and master strings may be analyzed using n-grams, such as bigrams, for example. A bigram or digram is a sequence of two adjacent elements from a string of tokens, which are typically letters, syllables, or words, for example. A bigram is an n-gram for n=2. In one example embodiment, dice coefficients may be determined as features of the input record and most similar master record (Top1), for example. Dice coefficients, or "dice," are a statistic used for comparing the similarity of two samples as a ratio of overlap to total, for example. When applied to strings to determine similarity, the coefficient may be calculated for two strings, S1 and S2 using bigrams as follows:

$$S1=ABCD; S2=ABE$$

$$\text{Overlapping Bigrams}=AB; \text{Total Bigrams}=(2\times AB,BC,CD,BE)$$

$$\text{Dice Coefficient}=\text{Overlap}/\text{Total}=AB/(2\times AB,BC,CD,BE)$$

where the overlap is the number of character bigrams found in both strings (here, only AB, so overlap=1) and total is the total number of bigrams in both strings (here, 5). Thus, the Dice Coefficient for the above strings is ⅕=0.2. Accordingly, embodiments of the present disclosure may determine a plurality of ratios of a first value to a second value. As illustrated above, the first value may be an overlap of bigrams between one or more string components in the input record and corresponding string components in the most similar master string representation, and the second value may be a total number of bigrams in the one or more string components in the input record and the string components in the most similar master string representation, for example.

In one example implementation, dice coefficients are determined for a name string component, address string component, and the total strings (all characters in each string) of the input record and most similar (Top1) master record from the similarity search. Additionally, another feature is a distance measure of the similarity scores of the topN similarity results. One example distance measure is the sigmoid function as follows:

$$\text{Feature}\_x=\text{sigmoid confidence score}=(\text{score }1-\text{score }2)/(\text{score }2-\text{score }3).$$

The following is example code for determining a bigram:

```
def
dice_coefficient(a,b):
            if not len(a) or not len(b): return 0.0
            if len(a) == 1: a = a + u'_'
            if len(b) == 1: b = b + u'_'
            a = ''.join(sorted(set(re.split(r'\W+', a.strip( ).upper( ))))))
            b = ''.join(sorted(set(re.split(r'\W+', b.strip( ).upper( ))))))
            a_bigram_list = [ ]
            for i in range(len(a) - 1):
                a_bigram_list.append(a[i:i + 2])
            b_bigram_list = [ ]
            for i in range(len(b) - 1):
                 b_bigram_list.append(b[i:i + 2])
                 a_bigrams = set(a_bigram_list)
                 b_bigrams = set(b_bigram_list)
                 overlap = len(a_bigrams & b_bigrams)
                 dice_coeff = overlap * 2.0 / (len(a_bigrams) +
            len(b_bigrams))
                 return dice_coeff
```

The following is example code for determining a sigmoid score:

```
def
compute_sigmoid_value(x1,x0=0):
                        return -1 + (2 / (1 + math.exp(-(x1 - x0))))
def
get_sigmoid(results_list):
            top3 = [float(results_list[i][6]) \
            if i < len(results_list) and len(results_list[i]) > 0 else 0
            for i in range(3)]
               if min(top3) != 0:
                 return compute_sigmoid_value((top3[0] - top3[1]) /
            (top3[1] - top3[2])) \
                 if (top3[1] - top3[2]) != 0 else 1
               else:
                 return 0
```

Additionally, in one example implementation, another feature may be whether the street addresses match or not [0,1], for example. Thus, a summary of features for the example above is: (x1,x2,x3,x4,x5)=(dice (all strings), dice_name, dice_street, sigmoid, same street).

Finally at 305, the features may be weighted and combined to produce a score. As illustrated in FIG. 3 and described above, a training set 303 comprising a like set of features may be input to a probability maximizer/prediction error minimizer 304 to produce a set of weights, wi (i=1 . . . N), for example. The weights are then combined with the features to produce the final score.

Example features are summarized as follows:
Dice similarity score on name of top1 result, a number ranging [0,1]
Dice similarity score on address of top1 result, a number ranging [0,1]
Dice similarity score for all fields concatenated of top1 result, a number ranging [0,1]
Sigmoid confidence score from similarity search scores of top3 results, a number ranging [0,1]
If same street address for top1 result, categorical, 1 for the same 0 for different −1 for not available Computer software code may determine all the scores for the above features. At this stage, the data has been transformed from text information to numbers as xi. Final scores, Y, may be determined as a weighted combination of xi and wi, for example, where the weights, wi, are based on large training sets of variables xi, for example. In one embodiment, a final score may be determined from a logical regression as follows:

$$\text{Final score}=1/[1+e^{-(w0+w1x1+w2x2+w3x3+w4x4+w5x5)}].$$

In one example implementation, the probability maximizer/prediction error minimizer 304 is configured to maximize the probability of the given xi and Y valid results and minimize the prediction errors/loss. In other words, embodiments of the present disclosure may use features derived from input records, master records, and final scores to minimize error as illustrated in the above training set where the numeric values (e.g., dice coefficients, sigmoid scores, and specified direct matches) are the features, xi, used to generate weights wi. One example probability maximizer/prediction error minimizer method used to find the minimum of a function is gradient descent. Another example is coordinate descent, for example. While feeding above features in, the model may iterate through different pairs of weights along one direction at a time until it maintains a minimum error. As input records are received and features and final scores generated, a portion of the resulting data may be fed back into the training set to improve the accuracy of the model, for example.

Once a final score is generated, the final score may be analyzed to determine further processing. In one embodiment, if the final score is greater than a first threshold (e.g., final score >0.75), the input record is automatically merged into the most likely master record. If the score is less than the first threshold and greater than the second threshold (0.59<final score <0.75), then the input record and most likely master record may be sent to a user for manual verification prior to automatic merger, for example. If the score is less than a second threshold (<0.59) that is less than the first threshold, then the input record is not merged into the master record. If the score is lower than 0.59, for example it may indicates one of the following: 1) a new hotel, which is not covered in master data, 2) a mismatch on masters due to significant differences of input data, or 3) insufficient information to make a confident match. These input records are stored for future review, and the data may be run against external data sources and added as new vendors.

In one embodiment, the process may apply a final regular expression match between particular fields as a final catch against erroneous results. For example, one or more string components of the input records may be specified, such as a street address, for example. If the final score for a particular input record is above the threshold for automatic merging, the specified string components in the particular input record may be compared to the corresponding string components in the most similar master string representation. If they don't match (e.g., street address for the input does not match the street address for the master), then the input record may be rejected and sent for manual evaluation, for example, even when final score is above the threshold.

In one embodiment, merging may include generating a difference record. For example, if the final score is greater than a threshold (e.g., score >0.75), a difference record comprising one or more string components that are different between the input record and the most similar master record is generated. An example difference record is as follows: id: 1234 add:{merchant id: AX204}, where "id" may be an identification of the master record in the master data store, for example. In this example, an input record includes a merchant id, AX204, which is not in the master record. Thus, the difference record includes an identifier (e.g., "add" operator) indicating what operation is required to be performed on the master record to make the input record and master record match. In one embodiment, a plurality of the difference records for a corresponding plurality of input records and master records may be stored (e.g., in the distributed file system storage 120). Additionally, the difference records may be applied to the master records as each input record is processed, and in accordance therewith, data in the master records can be supplemented over time. In the example difference record above, the system reads the difference file and performs an "add" operation to the master data and appends the mertchant id=AX204 to the master record automatically, for example. As mentioned above, the string representations in the input records and master records may include a payment system identifier, a supplier identification, a name, and an address. In one embodiment, the string representations comprise codes corresponding to a plurality of entities, and the different codes are automatically appended to the master string when the score is greater than a threshold without interaction from a user. For example, Amadeus codes, Northstar codes, chain codes, or any of a wide range of codes corresponding to entities, such as hotels, for example, may be automatically appended over time based on the integrated similarity search and machine learning techniques described herein. Supplementing additional data into the master records not only has the advantage of making the master records more robust, but it also improves the matching abilities of the system over time, for example. In other embodiments, for very low final scores, corresponding difference files may be quarantined, where the difference files are pushed to a user for manual review, for example.

In addition to updating master records based on the final score, input records may be stored in storage 120 and linked to (or otherwise associated with) the matching master records and the difference records, for example.

Another advantage of generating difference records pertains to rollback and document lifecycle analysis. In an automated system, it may be desirable to determine how a particular element of data was entered into the system. Storing difference files allows the system to be rolled back to an earlier state. In one embodiment, the master records may be rolled back based on the difference records. For example, if the difference files for a particular master record (id: 1234) are all adds, the data added by each difference record can be removed to obtain the state of the master record before the difference files were applied.

Asynchronous Distributed Data Cleansing Architecture

Embodiments of the present disclosure may also include an asynchronous distributed data cleansing architecture. One problem with processing vast amounts of data records is that traditional database read and write operations into and out of tables in a standard database may not be fast enough for certain applications. The present disclosure includes an advantageous architecture that may scale up the number of nodes used to process records and, in some embodiments, process records asynchronously to improve performance of the overall system. For example, one problem with data cleansing is the problem/challenge of high data volume and extreme data variability. Generally applying asynchronous programming and distributed processing to the problem of data cleansing overcomes linear processing constraints and allows for application of multiple matching techniques.

Figure 4:
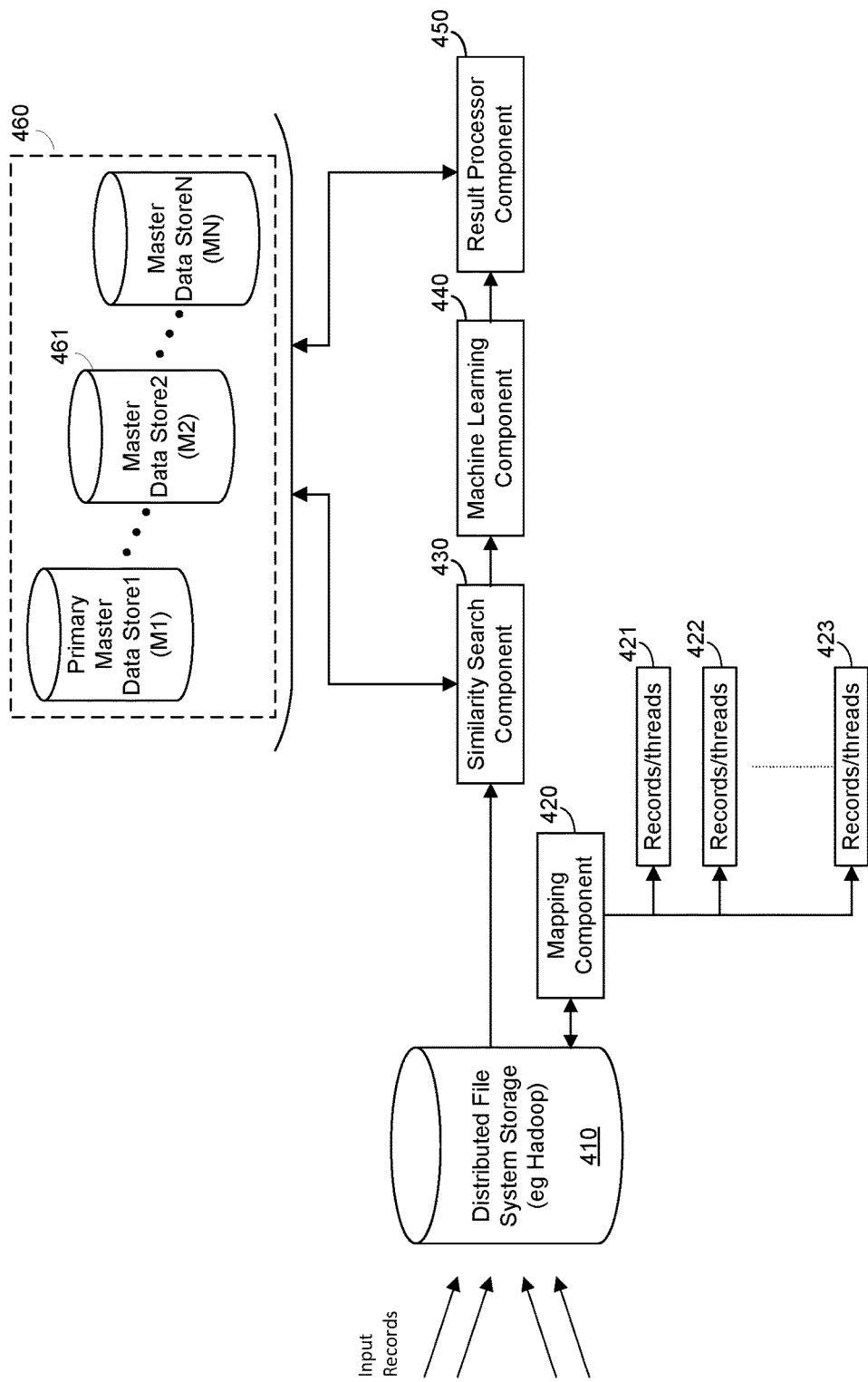
FIG. 4 illustrates distributed asynchronous data cleansing according to another embodiment.

FIG. 4 illustrates an example asynchronous distributed data cleansing architecture. Input records may be received in distributed file system storage 410, such as Hadoop, for example. For embodiments that include a mapping component that may normalize, validate, standardize, and/or prioritize input records, for example, mapping component 420 may receive input records and assign records to a plurality of different threads 421-423, for example. This process may occur by sequentially processing each record, for example. Accordingly, one or more of the string components in each input record may be sequentially mapped into one or more corresponding master string components using a plurality of program execution threads.

In this example, input records are then processed by a similarity search component 430. The similarity search component may be carried out asynchronously against distributed master data store 460, for example. The latency of accessing traditionally stored data in databases through database management systems and database applications may cause a bottle neck in data processing of records in a data cleansing process of the type described herein. Features and advantages of the present disclosure include storing master data redundantly in a plurality of master data stores as illustrate at 460. Here, N master data stores are shown, where N is an integer. As each input record is received and processed by similarity search component 430, a query including a search string may be sent to distributed master data store 460 for processing. In one embodiment, the similarity searches are generated and processed asynchronously. For example, a similarity search query may be sent, and then the next similarity search query may be sent before a result of the previous query is finished processing. Asynchronous processing may include generating a notification when a particular process is finished, for example. Listener code (aka watcher code) may receive the notification of the completed similarity search and forward the results to machine learning component 440, for example. For example, a similarity search (aka, Elasticsearch (ES)) may query asynchronously to the distributed storage system 460 because it may have very minimal dependency to execute. First, a connection to system 460 is established, and a query (e.g., query_string="string") may be sent. The processing associated with executing this query_string on the data store 460 and gathering of the matching results may all be done by distributed data store 460, for example. When processing "query_string" is finished, data store 460 may send a response back as a JavaScript Object Notation, JSON, file data format to the calling process, for example. Accordingly, all the calling process had to do was fire a connection to the distributed data store and wait for result.

In one embodiment, distributed master data store 460 comprises a plurality of data stores including a primary data store 461 and a plurality of secondary data stores. The primary (aka, "master data store" or "controlling data store") receives similarity search queries and may delegate such queries to other data stores in the distributed data storage system 460, for example. As queries are received, a primary data store 461, for example, may determine loading across the distributed storage system 460 and determine which data store in the system is suitable for generating the fastest results. Primary data store 461 may include an interface for receiving a similarity search, as well as an interface for performing create, read, insert, and delete operations. Received similarity search queries may be forwarded to other nodes, 1-N, in the system for execution, for example. Master records may be stored redundantly across all storage units (aka, "nodes" or "machines") in the system, for example. According, a primary data store may delegate a particular similarity search query to a node in system 460 with less loading than other nodes, for example, to perform the query. Each node may return results directly to similarity search component 430, for example.

Machine learning component 440 may receive query results and process the results using a machine learning algorithm, for example. If a sufficiently high final score is obtained from the machine learning component 440, where a match between an input record and a master record from storage system 460 is determined with high confidence, then the results may be merged by result processing component 450. Result processor component 450 may, for example, asynchronously merge the input records into master records in distributed master data store 460, for example. In one embodiment, as results are received by the result component 450, a first instruction (e.g., an insert) may be sent to a primary one of the plurality of master record data stores. Next, loading may be determined across the plurality of master record data stores 460. Accordingly, the first instruction may be delegated from the primary data store 461 for execution by a first secondary one of the N master record data stores, for example. As with similarity searching, subsequent instructions may be sent before the results of previous instructions are received. Accordingly, asynchronous result processing may include sending one or more subsequent instructions (e.g., more inserts) to the primary master data store 460 before a result of the first instruction is received from the secondary master data store. As instructions are finished executing, a notification may be generated to result processor 460 indicating that the instruction has completed its processing, for example.

Advantageously, asynchronous processing allows a plurality of instructions to start processing simultaneously rather than waiting for one instruction to finish processing before the next instruction can start processing. For example, similarity search queries may be triggered sequentially against the distributed master data store 460 based on a plurality of input records, where a subsequent query is triggered before a previous query has finished and returned a result. Additionally, other downstream operations against the distributed master data store 460 may be performed asynchronously and simultaneously with the similarity search queries. For example, insert, get, delete, or other operations may be performed asynchronously and simultaneously as the similarity search queries are being executed. As used herein, simultaneously means that multiple operations are running or issued against the distributed master data store at around the same time period, for example, and some operations may be running at the same time on different data stores in the distributed master data store, for example.

In one embodiment, the primary data store includes an interface for receiving a plurality of instructions to trigger processes such as a similarity search, insert, get, and/or delete, for example. A first input record may trigger a first similarity search query, which may be received and processed by one of the master data stores. Before the first query has finished and returned a result, a second input record may trigger a second similarity search query, which may be received and processed by one of the master data stores. Additional input records may trigger additional similarity search queries before the first similarity search query returns a result. In some cases, later triggered queries may return results before earlier/previously triggered queries, for example. When the first similarity search query returns a result, the result may be used to perform additional operations against the distributed master data store 460. These additional operations, such as a get or insert of a modified master record, for example, may also be performed asynchronously, such that processes may be initiated before previously initiated processes have been finished, for example. For large volumes of input records, downstream processes (e.g., get, insert, etc. . . . ) may be executed simultaneously with upstream processes (e.g., similarity search queries). From the distributed master data stores perspective, the primary master data store receives instructions (e.g., a command to execute a similarity search with search strings or an insert command with string components for a master record), forwards the instructions for execution by one of the primary (itself) or secondary master data stores, and each master data store returns a result when it is finished. In one embodiment, asynchronous calls may comprise two (2) components: an initiation command (or "an issuer") and a callback (or "a watcher"), examples of which are included below.

Figure 5:
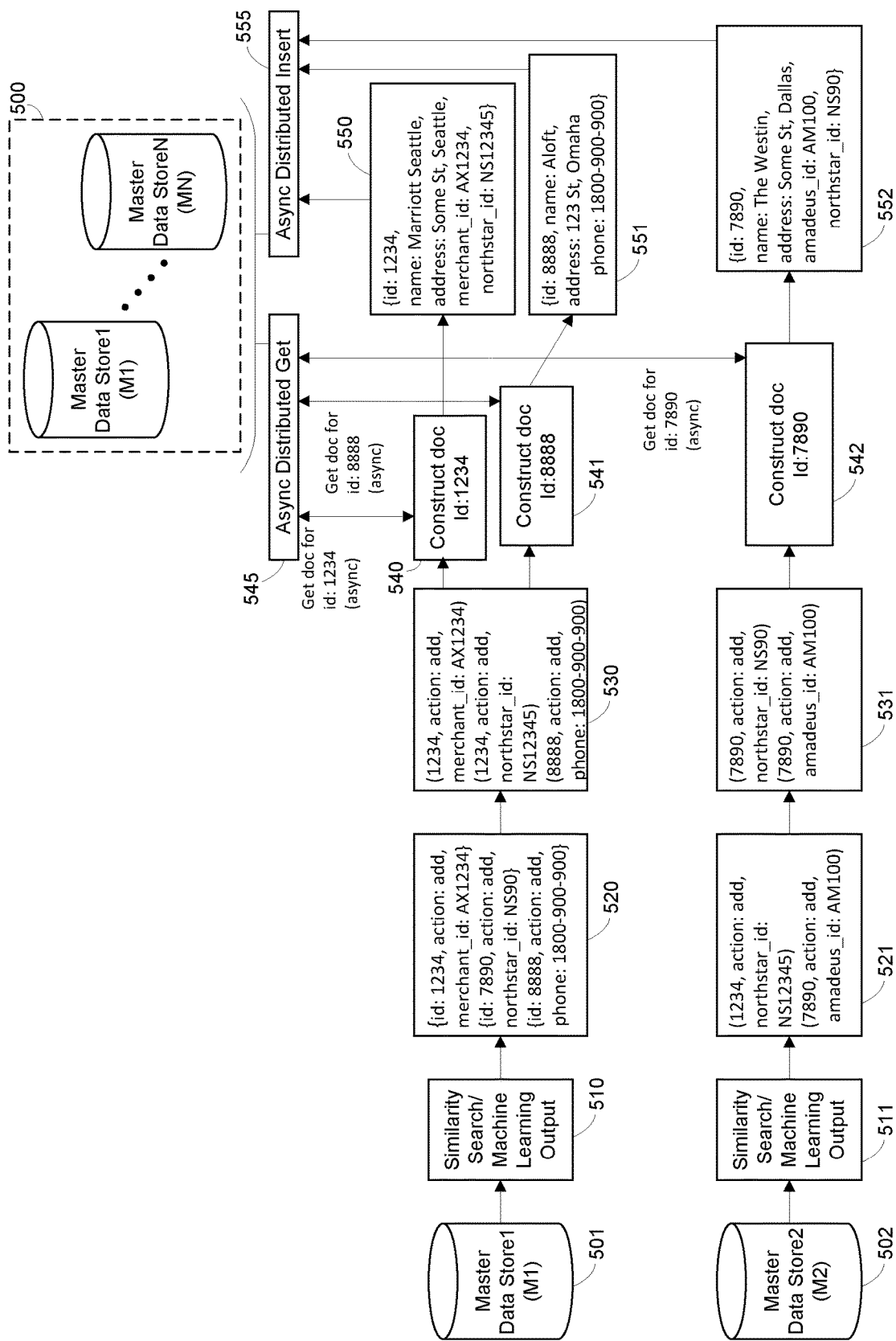
FIG. 5 illustrates an example of result processing according to an embodiment.

FIG. 5 illustrates an example of result processing according to an embodiment. In this example, two asynchronous distributed similarity searches are applied against master data stores 501 and 502. The similarity search results are processed using machine learning algorithms 510 and 511, which result in final scores greater than a threshold and difference files are generated based on results from master data store 501, at 520, and master data store 502, at 521. Difference records produced by the similarity search results from data store 501 may include master record identifications (IDs), specified actions/operations to be performed representing differences between input records and corresponding master records (e.g., add), and string components (e.g., data to be added). Similarly, difference records produced by the similarity search results from data store 502 may include master record identifications (master record IDs), specified actions to be performed representing differences between input records and corresponding master records, and string components. In some embodiments, difference records from different data store result sets may advantageously be grouped together based on the same master records, for example. In this example, difference records for master record ID 1234 from master data store 501 and master data store 502 are grouped at 530. Similarly, difference records for master record ID 7890 from master data store 501 and master data store 502 are grouped at 531. In this example, a complete master record is constructed for each ID using asynchronous "get" commands to interface 545 of distributed data store 500, for example. Accordingly, a "get" command for master record 1234 may be issued asynchronously at 540, another "get" command for master record 8888 may be issued asynchronously at 541, and yet another "get" command for master record 7890 may be issued asynchronously at 542. As results of the "get" commands are received, the difference files may operate on the master records. For example, the grouped actions for master record 1234 are performed against master record 1234, which results in a new master record 1234 including added "merchant_id: AX1234" and "northstar_id: NS12345 as shown at 550, for example. Similarly, as master records 8888 and 7890 are returned, fields may be added to each as shown at 551 and 552, respectively. In one embodiment, these "get" operations may continue to be performed asynchronously for new groupings even as the supplemented master records 550, 551, and 552 are asynchronously inserted into the distributed master data store 500 using insert interface 555, for example.

Example code for asynchronously retrieving and modifying master records from a data store is as follows. As mentioned above, asynchronous code constructs may be included in the similarity search component and result processor component. For example, asynchronous programming constructs may include an issuer and watcher. This asynchronicity may be implemented by "async"/"await" keywords, for example. Embodiments of the present disclosure may use "async"/"await" keywords to achieve asynchronous operation while reading and writing from external data sources, such as the distributed master data store 500, for example (e.g., to perform an elastic search). Referring back to the distributed data processing diagram in FIG. 5, "get" doc and "insert" data operations on distributed master data store 500 are defined asynchronously. Asynchronous programming may be used so that the process performing this operation does not have to halt and wait for the GET/INSERT operations to complete. It can continue with other operations or serve other requests while each GET/INSERT operation is running. For example, if the system adds "merchant id: AX1234" to master record (id: 1234) and "merchant id: V18888" to master record (id: 8888) then example syntax may be as follows:

```
async def function( ):
    ...
    await some operation
    ...
async def modify_master_record(id, changes):
    document = await get_from_elasticsearch(doc_id = id)
    modified_document = apply_changes(document, changes)
    return modified_document
main_function( ):
    ## Some map operation
    ## Some reduce operation
    ## Now we have records in the format (key, value): (1234, {action: add, merchant_id: AX1234}), (8888, {action: add, merchant_id: VI8888})
    new_master_record = Map(Foreach (key, value):
```

-continued

```
modify_master_record(key, value))
    ## do other operations
```

When modify_master_record is called for id: 1234, the above example python process does not wait there until get_from_elasticsearch and apply_changes are performed on that document. It just leaves a pointer (callback) to get notified after get_from_elasticsearch is completed. However, the main python process goes on to call modify_master_record for id: 8888 and so on (until there are compute resources available to the process to continue) while the callback pointers ensure that the returned responses will continue the rest of the operations.

A similar code structure may be used to perform similarity searches against distributed master data store 500. For example, in embodiments where a machine learning (or artificial intelligence (AI)) model is applied to one or more similarity search results, the asynchronous programming paradigm may be applied to perform the similarity search on the distributed master record data store (e.g., elasticsearch), and the results from these searches may be fed into the model, for example. Accordingly, async may be used only when the process needs to interact with an external entity, such as the distributed master record data store. Accordingly, async is used to get/write documents from the data store. Once the whole corpus of similar records needed for the machine learning model is obtained, the results are sent to the model and the model processes the data to produce a final score, for example, as described above. The evaluation of results by the model may not be async, for example, because the system may need to load the model to the process's context to run it, where the processes context may include the memory of the process—where it has the code, libraries the code refers to, the variables, machine configurations and so on. Before parallel async processes are spun off, it may have dependency on the model being available/loaded to the context of the evaluating process. Hence, model evaluation may happen synchronously on the parent process in some example implementations. Example pseudo code for asynchronous similarity searching may be as follows:

```
async def supplier_search(supplier_info):
    ## Call Elasticsearch to get all similar suppliers based on the input info
    ## This is asynchronous operation
    many_documents = await get_from_elasticsearch(supplier_info)
        ## Once all the documents (corpus for the ML model) are received
        ## then call the ML model and wait for the results
    best_supplier = call_ML_model (many_documents)
    return best_supplier
```

Hardware

Figure 6:
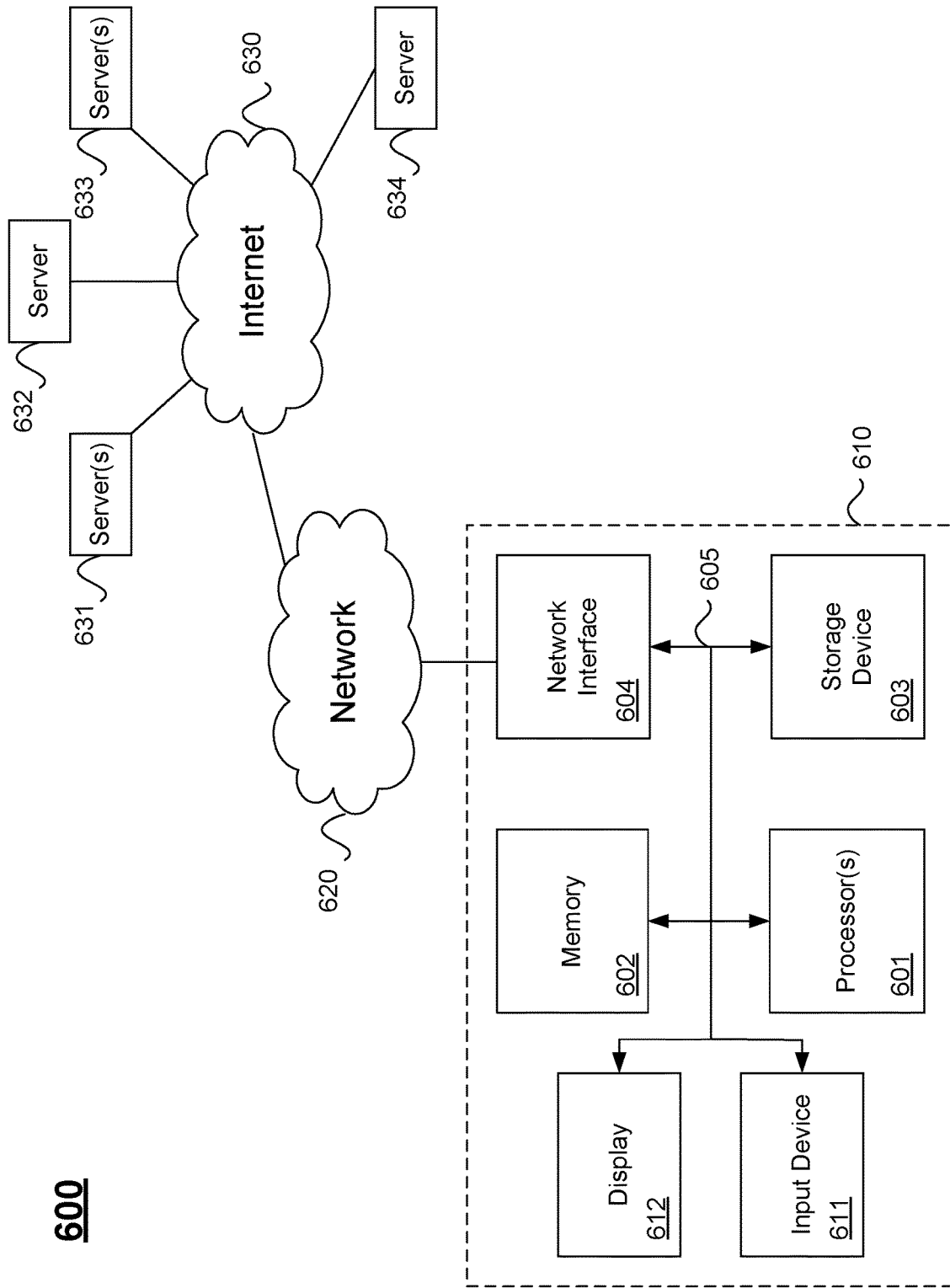
FIG. 6 illustrates hardware of a special purpose computing machine configured according to the above disclosure.

FIG. 6 illustrates hardware of a special purpose computing machine configured according to the above disclosure. The following hardware description is merely one example. It is to be understood that a variety of computers topologies may be used to implement the above described techniques. An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. Memory 602 may also be used for storing programs executed by processor(s) 601. Possible implementations of memory 602 may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device 603 and memory 602 are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses for coupling various components of the computer together, for example.

Computer system 610 also includes a network interface 604 coupled with bus 605. Network interface 604 may provide two-way data communication between computer system 610 and a local network 620. Network 620 may represent one or multiple networking technologies, such as Ethernet, local wireless networks (e.g., WiFi), or cellular networks, for example. The network interface 604 may be a wireless or wired connection, for example. Computer system 610 can send and receive information through the network interface 604 across a wired or wireless local area network, an Intranet, or a cellular network to the Internet 630, for example. In some embodiments, a browser, for example, may access data and features on backend software systems that may reside on multiple different hardware servers on-prem 631 or across the Internet 630 on servers 632-635. One or more of servers 632-635 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

APPENDIX A

-- Example Input Record --
Structure :
ID_TYPE SUPPLIER_ID MC_CODE LEGAL_NAME
　DOING_BUSINESS_AS STREET_ADDRESS_1
　STREET_ADDRESS_2 CITY STATE COUNTRY_CODE
　POSTAL_CODE STREET_ADDRESS_3 STREET_ADDRESS_4
　COUNTRY_NAME SUPPLIER_TYPE DUNS_NUMBER TAX_ID
　CHAIN_CODE PHONE_NUMBER FAX_NUMBER
　EMAIL_ADDRESS SOURCE_TYPE_CODE NORTHSTAR_ID
　AMADEUS_ID GALILEO_ID SABRE_ID WORLDSPAN_ID
-- Sample Data
AX 9880164413 7011 THE ST REGIS SHANGHAI THE ST REGIS

APPENDIX A-continued

SHANGHAI NO 889 DONGFANG RD SHANGHAI CN
　200122 USR
VI 000040847606 3509 MARRIOTT MAYO CLINIC ROCH
　ROCHESTER MN US 559020000
　　USR
AX 2096322110 7011 BVP TENANT, LLC HILTON BVP FD 04202
　HILTON BUENA VISTA PALACE 1900 E. BUENA VISTA DRIVE
LAKE BUENA VISTA FL ORLANDO FL US
　32830 472197652
　USR
AX 1314305863 7011 EDITION MANAGEMENT LLC THE NEW
YORK
EDITION ONE MADISON AVENUE NEW YORK CITY
NY NEW YORK NY US 10013
　364769508 USR
AX 9502077431 7011 MAINZER LANDSTRASSE HOTELBETRIEBS
GMBH
　HOLIDAY INN FRANKFURT - ALTE OPER MAINZER LANDSTR.
　27 FRANKFURT DE 60329
　DE288496028 USR
AX 9810108068 7011 LUXURY HOTELS INTERNATIONAL OF HK
LTD
　J W MARRIOTT HOTEL HONG KONG PACIFIC PLACE
88 QUEENSWAY ADMIRALTY HK
　2046642200212130 USR
AX 5270461403 7011 THE SIGNATURE-LODGING THE SIGNATURE
FRONT DESK 3799 LAS VEGAS BLVD. S

What is claimed is:

1. A method comprising:
receiving transactional data from a plurality of payment systems, each payment system in the plurality of payment systems configured to process a set of data records representing user-initiated point of sale (POS) credit card transactions involving purchases of products or services from entities, the transactional data comprising a plurality of input records, each input record in the plurality of input records comprising one or more string components used to represent an entity specified in a user-initiated POS credit card transaction processed by a payment system in the plurality of payment systems;
storing master records redundantly in a distributed master record data store comprising a plurality of master record data stores;
asynchronously performing similarity searches using string components from the input records across the distributed master record data store, the similarity searches each configured to retrieve a most similar master record comprising master string components, wherein the most similar master record comprises most similar master string components in the distributed master record data store to string components in each input record;
generating a set of weights for a first set of features based on a training set;
for each input record, generating a second set of features based on the input record and the most similar master record corresponding to each input record and generating a final score by multiplying each feature in the second set of features with a weight in the set of weights for a corresponding feature in the first set of features, wherein the final score indicates a likelihood of a match between a particular input record and the most similar master record; and
asynchronously updating the most similar master records in the distributed master record data store when the final scores are greater than a threshold by adding at least some of the string components from the input records into at least a portion of the most similar master records, said asynchronously updating including:
  generating a plurality of difference records comprising one or more string components that are different between particular input records and corresponding most similar master records, and
  grouping the plurality of difference records having a same most similar master record retrieved from different master record data stores in the distributed master record data store.

2. The method of claim 1 wherein asynchronously updating further comprises:
  asynchronously retrieving most similar master records for each group of difference records from the distributed master record data store based on a master record identification in each corresponding difference record;
  appending the string components in the difference records in a group of difference records to a corresponding retrieved master record to produce appended master records; and
  asynchronously inserting the appended master records into the distributed master record data store.

3. The method of claim 1 wherein generating the second set of features for each input record comprises comparing string components in the input record and in the most similar master record.

4. The method of claim 3 wherein the set of features includes dice coefficients associated with comparing a name string component and an address string component of the each input record with a name string component and an address string component of the most similar master record.

5. The method of claim 1 wherein asynchronously updating comprises:
  sending a first instruction to a primary one of the plurality of master record data stores; and
  delegating the first instruction for execution by a first secondary one of the plurality of master record data stores.

6. The method of claim 5 wherein asynchronously updating further comprises:
  sending a second instruction to the primary one of the plurality of master data stores before a result of the first instruction is received from the secondary one of the master data stores; and
  generating a notification when the first instruction has finished executing.

7. The method of claim 1 wherein a gradient descent function is used to generate the set of weights for each input record based on the training set.

8. The method of claim 1 further comprising sequentially mapping, before the similarity searches, one or more of the string components in each input record into one or more corresponding master string components using a plurality of program execution threads.

9. A method comprising:
  receiving transactional data from a plurality of payment systems, each payment system in the plurality of payment systems configured to process a set of data records representing user-initiated point of sale (POS) credit card transactions involving purchases of products or services from entities, the transactional data comprising a plurality of input records, each input record in the plurality of input records comprising a plurality of string components used to represent an entity specified in a user-initiated POS credit card transaction processed by a payment system in the plurality of payment systems;
  storing master records redundantly in a distributed master record data store, the master records comprising a plurality of master string components, and the distributed master record data store comprising a primary master record data store and a plurality of secondary master record data stores;
  asynchronously processing a plurality of similarity search queries, each similarity search query comprising at least one of the string components from a particular input record, the similarity search queries retrieving master records having most similar string components in the distributed master record data store corresponding to each similarity search query;
  receiving the plurality of similarity search queries in the primary master record data store;
  delegating one or more of the similarity search queries from the primary master record data store to the secondary master record data stores;
  executing each query to retrieve master records having most similar string components in the distributed master record data store corresponding to each similarity search query;
  generating a set of weights for a first set of features based on a training set;
  for each input record, generating a second set of features based on the input record and the most similar master record corresponding to each input record and generating a final score by multiplying each feature in the second set of features with a weight in the set of weights for a corresponding feature in the first set of features, wherein the final score indicates a likelihood of a match between a particular input record and the most similar master record; and
  modifying the retrieved master records based on the corresponding input records when the final scores are greater than a threshold by adding at least some of the string components from the input records into at least a portion of the most similar master records, said modifying including:
    receiving a plurality of difference records comprising one or more string components that are different between particular input records and corresponding most similar master records, and
    grouping the plurality of difference records having a same most similar master record retrieved from different master record data stores in the distributed master record data store.

10. The method of claim 9 wherein modifying the retrieved master records further comprises:
  asynchronously retrieving most similar master records for each group of difference records from the distributed master record data store based on a master record identification in each corresponding difference record; and
  appending the string components in the difference records in a group of difference records to a corresponding retrieved master record to produce appended master records.

11. The method of claim 9, wherein generating the second set of features for each input record comprises comparing string components in the input records and the master record having most similar string components,
  wherein the second set of features includes dice coefficients associated with comparing a name string component and an address string component of the each input record with a name string component and an address string component of the most similar master record.

12. The method of claim 9 wherein storing master records redundantly in a distributed master record data store comprises:
storing each master record in each of the secondary master record data stores and the primary master record data store; and
when a particular master record is changed in one master record data store of the distributed master record data store, propagating the changes to each of the other master record data stores.

13. A non-transitory machine-readable medium storing a program executable by at least one processing unit of a computer, the program comprising sets of instructions for:
receiving transactional data from a plurality of payment systems, each payment system in the plurality of payment systems configured to process a set of data records representing user-initiated point of sale (POS) credit card transactions involving purchases of products or services from entities, the transactional data comprising a plurality of input records, each input record in the plurality of input records comprising one or more string components used to represent an entity specified in a user-initiated POS credit card transaction processed by a payment system in the plurality of payment systems;
storing master records redundantly in a distributed master record data store comprising a plurality of master record data stores;
asynchronously performing similarity searches using string components from the input records across the distributed master record data store, the similarity searches each configured to retrieve a most similar master record comprising master string components, wherein the most similar master record comprises most similar master string components in the distributed master record data store to string components in each input record;
generating a set of weights for a first set of features based on a training set;
for each input record, generating a second set of features based on the input record and the most similar master record corresponding to each input record and generating a final score by multiplying each feature in the second set of features with a weight in the set of weights for a corresponding feature in the first set of features, wherein the final score indicates a likelihood of a match between a particular input record to the most similar master record; and
asynchronously updating the most similar master records in the distributed master record data store when the final scores are greater than a threshold by adding at least some of the string components from the input records into at least a portion of the most similar master records, said asynchronous updating including:
generating a plurality of difference records comprising one or more string components that are different between particular input records and corresponding most similar master records, and
grouping the plurality of difference records having a same most similar master record retrieved from different master record data stores in the distributed master record data store.

14. The non-transitory machine-readable medium of claim 13 wherein synchronously updating further comprises:
asynchronously retrieving most similar master records for each group of difference records from the distributed master record data store based on a master record identification in each corresponding difference record;
appending the string components in the difference records in a group of difference records to a corresponding retrieved master record to produce appended master records; and
asynchronously inserting the appended master records into the distributed master record data store.

15. The non-transitory machine-readable medium of claim 13 wherein generating the second set of features for each input record comprises comparing string components in the each input record and in the most similar master record.

16. The non-transitory machine-readable medium of claim 15 wherein the set of features includes dice coefficients associated with comparing a name string component and an address string component of the each input record with a name string component and an address string component of the most similar master record.

17. The non-transitory machine-readable medium of claim 13 wherein asynchronously updating comprises:
sending a first instruction to a primary one of the plurality of master record data stores; and
delegating the first instruction for execution by a first secondary one of the plurality of master record data stores.

18. The non-transitory machine-readable medium of claim 17 wherein asynchronously updating further comprises:
sending a second instruction to the primary one of the plurality of master data stores before a result of the first instruction is received from the secondary one of the master data stores; and
generating a notification when the first instruction has finished executing.

19. The non-transitory machine-readable medium of claim 13 wherein a gradient descent function is used to generate the set of weights for each input record based on the training set.

20. The non-transitory machine-readable medium of claim 13, the program further comprising sets of instructions for sequentially mapping, before the similarity searches, one or more of the string components in each input record into one or more corresponding master string components using a plurality of program execution threads.

21. A system comprising:
a processor;
a memory; and
non-transitory machine-readable medium storing a program executable by the processor, the program comprising sets of instructions for:
receiving transactional data from a plurality of payment systems, each payment system in the plurality of payment systems configured to process a set of data records representing user-initiated point of sale (POS) credit card transactions involving purchases of products or services from entities, the transactional data comprising a plurality of input records, each input record in the plurality of input records comprising one or more string components used to represent an entity specified in a user-initiated POS credit card transaction processed by a payment system in the plurality of payment systems;

storing master records redundantly in a distributed master record data store comprising a plurality of master record data stores;

asynchronously performing similarity searches using string components from the input records across the distributed master record data store, the similarity searches each configured to retrieve a most similar master record comprising master string components, wherein the most similar master record comprises most similar master string components in the distributed master record data store to string components in each input record;

generating a set of weights for a first set of features based on a training set;

for each input record, generating a second set of features based on the input record and the most similar master record corresponding to each input record and generating a final score by multiplying each feature in the second set of features with a weight in the set of weights for a corresponding feature in the first set of features, wherein the final score indicates a likelihood of a match between a particular input record and the most similar master record; and asynchronously updating the most similar master records in the distributed master record data store when the final scores are greater than a threshold by adding at least some of the string components from the input records into at least a portion of the most similar master records, said asynchronously updating including:

generating a plurality of difference records comprising one or more string components that are different between particular input records and corresponding most similar master records, and grouping the plurality of difference records having a same most similar master record retrieved from different master record data stores in the distributed master record data store.

* * * * *